(12) United States Patent
Sano et al.

(10) Patent No.: US 9,069,457 B2
(45) Date of Patent: Jun. 30, 2015

(54) PORTABLE TERMINAL

(71) Applicant: SONY MOBILE COMMUNICATIONS AB, Lund (SE)

(72) Inventors: Tatsuya Sano, Tokyo (JP); Naka Shibata, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 178 days.

(21) Appl. No.: 13/680,863

(22) Filed: Nov. 19, 2012

(65) Prior Publication Data
US 2013/0169564 A1 Jul. 4, 2013

Related U.S. Application Data

(60) Provisional application No. 61/582,649, filed on Jan. 3, 2012.

(51) Int. Cl.
G06F 1/16 (2006.01)
G06F 3/041 (2006.01)
G06F 3/0488 (2013.01)
G06F 3/14 (2006.01)

(52) U.S. Cl.
CPC ............ *G06F 3/0488* (2013.01); *G06F 1/1616* (2013.01); *G06F 1/1624* (2013.01); *G06F 3/1446* (2013.01); *G06F 1/1647* (2013.01); *G06F 1/1677* (2013.01); *G06F 1/1681* (2013.01); *G06F 3/0416* (2013.01); *G09G 2300/026* (2013.01)

(58) Field of Classification Search
CPC ..... G06F 3/041; G06F 3/0412; G06F 3/0416; G06F 3/044; G06F 3/045; G06F 1/1641; G06F 1/1647
See application file for complete search history.

(56) References Cited

U.S. PATENT DOCUMENTS

2010/0285853 A1* 11/2010 Endo et al. ................. 455/575.4
2010/0302179 A1* 12/2010 Ahn et al. ..................... 345/173
2013/0321340 A1* 12/2013 Seo et al. ....................... 345/174

FOREIGN PATENT DOCUMENTS

JP 2009-187290 8/2009

OTHER PUBLICATIONS

U.S. Appl. No. 14/142,214, filed Dec. 27, 2013, Sano, et al.

* cited by examiner

*Primary Examiner* — Gerald Johnson
*Assistant Examiner* — Christopher Kohlman
(74) *Attorney, Agent, or Firm* — Oblon, McClelland, Maier & Neustadt, L.L.P.

(57) ABSTRACT

An information processing apparatus including a first case that includes a first display having a touch-sensing function; a second case that includes a second display having a touch-sensing function; and a hinge mechanism configured to join the first and second cases in a rotatable manner such that both the first and second displays are exposed in a closed state and such that first and second displays are arranged side-by-side on substantially the same plane in an open state.

14 Claims, 20 Drawing Sheets

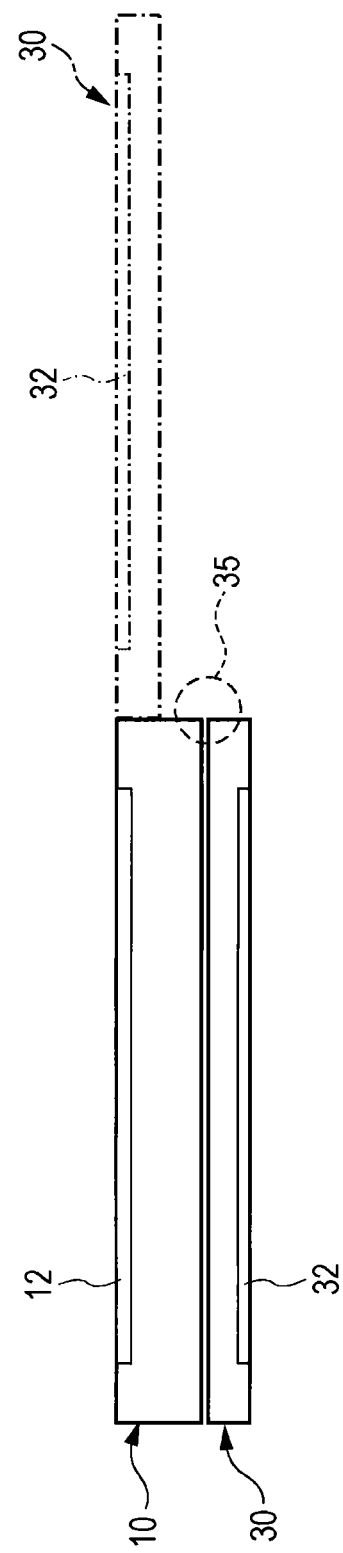

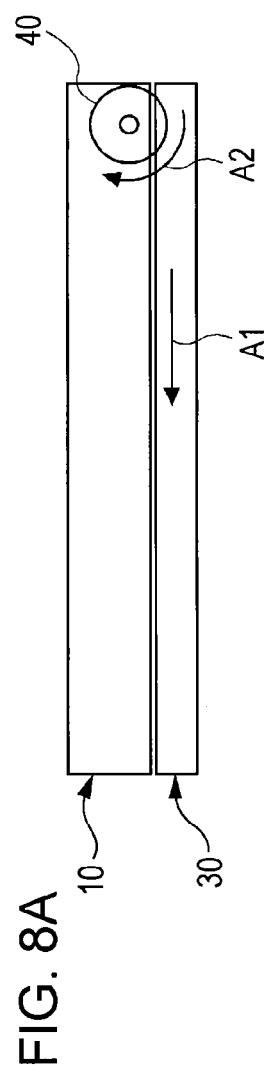
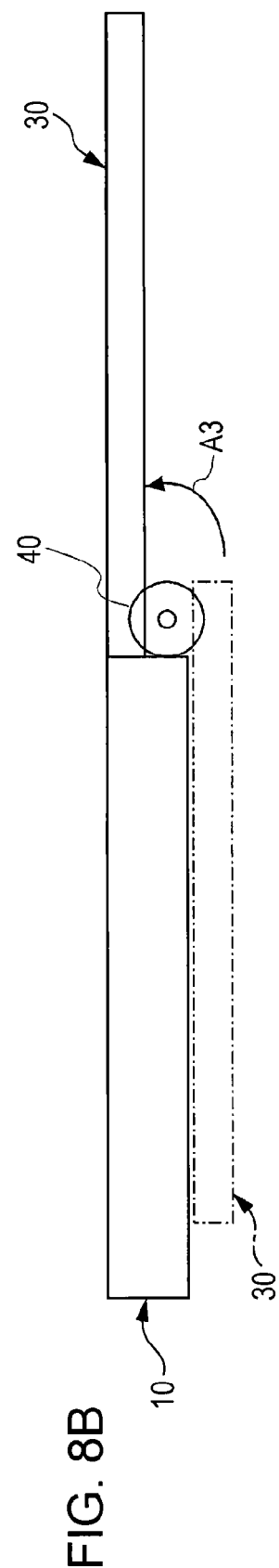

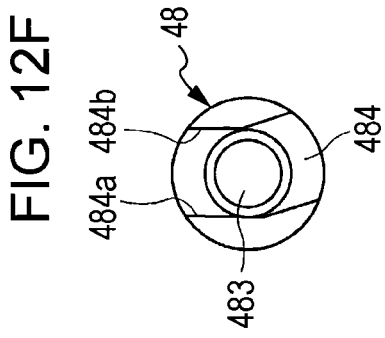
FIG. 12F
FIG. 12E
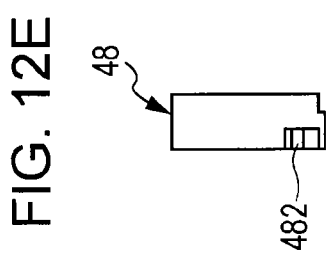
FIG. 12B
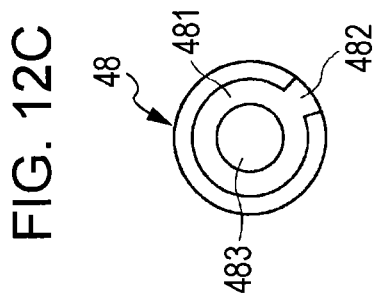
FIG. 12C
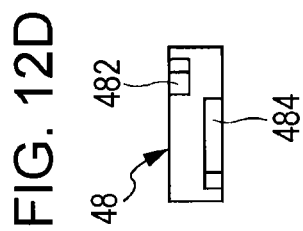
FIG. 12D
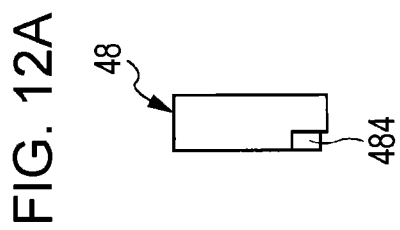
FIG. 12A

PORTABLE TERMINAL

CROSS REFERENCE TO RELATED APPLICATION

The present application claims the benefit of the earlier filing date of U.S. Provisional Patent Application Ser. No. 61/582,649 filed on Jan. 3, 2012, the entire contents of which is incorporated herein by reference.

BACKGROUND

1. Field of the Disclosure

The present disclosure relates to a portable terminal in which first and second display units having first and second display screens, respectively, are joined by a hinge mechanism.

2. Description of Related Art

Portable terminals called "smart phones" are rapidly becoming widespread these days. Such a portable terminal includes a display unit, which has a display screen with a touch-sensing function. In such a portable terminal, a user can input various instructions and information by touching the display screen.

This configuration can eliminate a numeric keypad, which is hardware. This enables a so-called straight-type portable terminal to be equipped with a large display screen relative to the size of a case.

A portable terminal having a display screen on the surface side of a case and a touch sensor on the back surface side, thereby improving input function, has been proposed (see Japanese Unexamined Patent Application Publication No. 2009-187290). This display screen is not greatly different from the size of a straight-type portable terminal.

SUMMARY

On the other hand, portable terminals called "tablet terminals" or "tablet-type terminals", which have larger display screens than smart phones and have a touch detection function, are also in the market place.

However, because the tablet terminals inevitably have to use a large case to accommodate a display device having a large-sized display screen, they suffer from a problem of lack of portability compared with smart phones.

Whether it be portable phone terminals or game terminals, a large screen is beneficial as long as the portability is ensured.

An embodiment of the present disclosure provides an information processing apparatus including a first case that includes a first display having a touch-sensing function; a second case that includes a second display having a touch-sensing function; and a hinge mechanism configured to join the first and second cases in a rotatable manner such that both the first and second displays are exposed in a closed state and such that first and second displays are arranged side-by-side on substantially the same plane in an open state.

BRIEF DESCRIPTION OF DRAWINGS

FIG. 6 is a diagram for explaining objects of a hinge mechanism according to the embodiment of the present disclosure.

FIGS. 8A and 8B are diagrams for explaining pulling force requirements in a closed state and an open state.

FIGS. 12A to 12F are a six-side view showing the exteriors of a left side surface, a top surface, a front surface, a bottom surface, a right side surface, and a back surface of a torque-reversing member, respectively.

DETAILED DESCRIPTION

An embodiment of the present disclosure will be described in detail below with reference to the drawings.

Figure 1A:
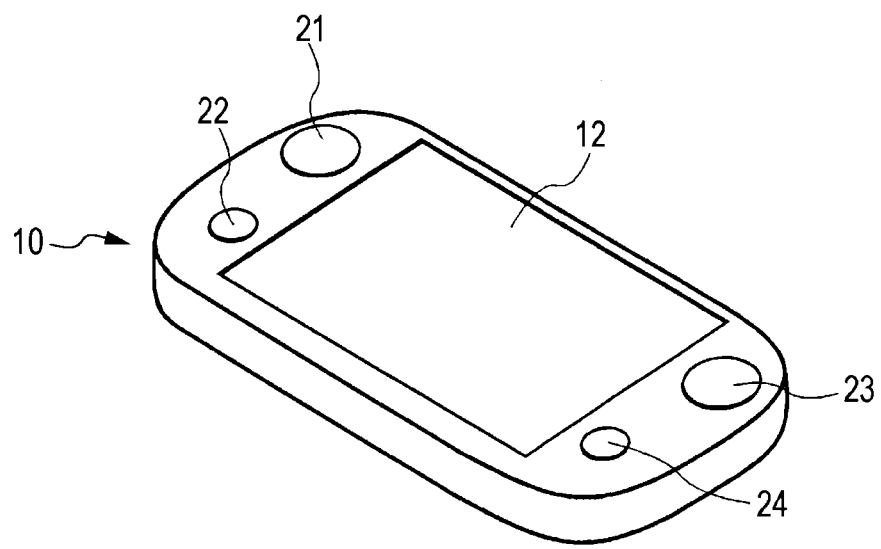
FIGS. 1A and 1B are a perspective view of a top surface and a perspective view of a bottom surface (back surface) of a portable terminal according to an embodiment of the present disclosure, respectively.
Figure 1B:
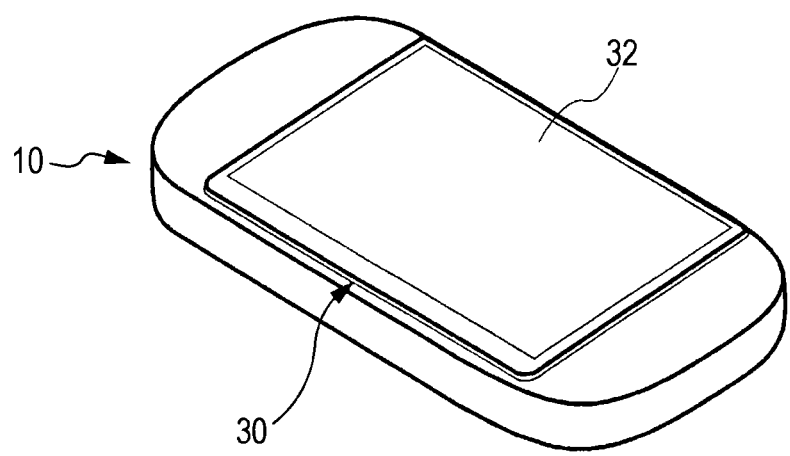

FIGS. 1A and 1B are a perspective view of a top surface and a perspective view of a bottom surface (back surface) of a portable terminal 100 according to this embodiment, respectively.

This portable terminal 100 includes a main case 10 and a sub case 30, which is joined to the main case 10 so as to be rotatable about a rotation axis, i.e., one side thereof extending in the longitudinal direction. The main case 10 is a first case that includes a first display unit having a first display screen with a touch-sensing function. The sub case 30 is a second case that includes a second display unit having a second display screen with a touch-sensing function. FIG. 1 shows a closed state in which the sub case 30 is closed with respect to the main case 10.

As illustrated in FIG. 1A, a display screen 12 with a touch-sensing function is exposed to the outside over a large part of the top surface of the portable terminal 100. Operation buttons 21, 22, 23, and 24 are arranged on both sides of the display screen 12 in the longitudinal direction of the main case 10. In this example, taking into consideration the use as a game machine, the operation buttons are arranged symmetrically on the main case 10 as it is held horizontally.

As illustrated in FIG. 1B, a display screen 32 with a touch-sensing function is exposed to the outside on the back surface of the portable terminal 100. In a closed state, the display screen 12 and the display screen 32 are in a back-to-back state.

Figure 2A:
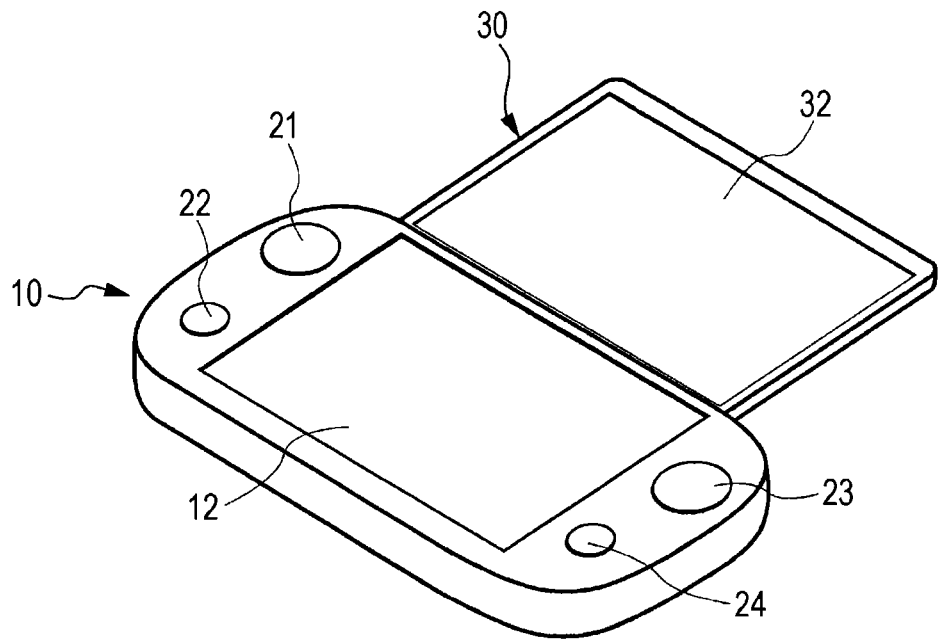
FIGS. 2A and 2B are a perspective view of the top surface and a perspective view of the bottom surface (back surface) of the portable terminal in an open state, respectively.
Figure 2B:
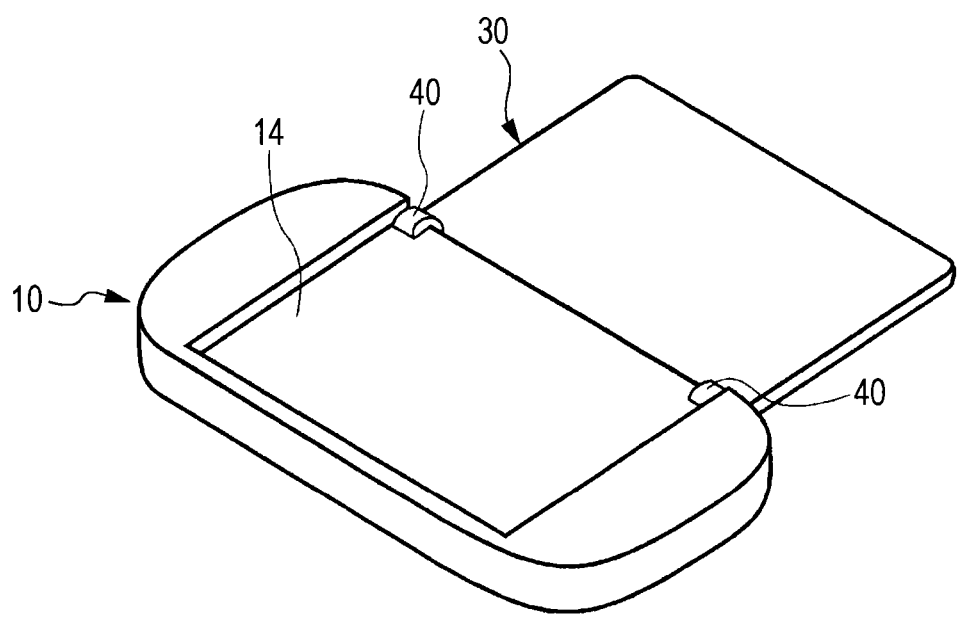

FIGS. 2A and 2B are a perspective view of the top surface and a perspective view of the bottom surface (back surface) of the portable terminal 100 in an open state, respectively.

As illustrated in FIG. 2A, in an open state, the display screen 12 on the main case 10 and the display screen 32 on the sub case 30 are arranged side-by-side substantially on the same plane, without a gap therebetween. In this open state, both the display screens 12 and 32 can be used as one large display screen of a tablet terminal.

As can be seen from FIG. 2B, the main case 10 and the sub case 30 are joined by a hinge mechanism 40 that joins one to the other so as to be rotatable. A recess 14 that accommodates the sub case 30 when the portable terminal 100 is closed is formed in the back surface of the main case 10. Although this recess 14 is not an essential component in the present disclosure, by accommodating the sub case 30, which is smaller than the main case 10, in the recess 14, the entire back surfaces of closed cases can be made flat.

In FIGS. 1A and 1B, the hinge mechanism 40 is hidden and cannot be viewed. In FIG. 2B, only a part of the hinge mechanism 40 can be viewed, and a large part of it is hidden. The configuration and feature of the hinge mechanism 40 will be described in detail below.

When this portable terminal 100 is used for game in a closed state, the display screen 32 of the sub case 30, which is folded back and stored in the back surface of the main case 10, can be used as a touch-sensing area (touch panel). For example, let us assume a usage pattern in which a user holds the closed portable terminal 100 horizontally in both hands from left and right, such that the display screen 12 faces up. In this case, the user can operate the operation buttons 21 to 24 on the top surface of the main case 10 with left and right thumbs, while viewing the display screen 12. At the same time, other fingers of the left and right hands can perform touch operations on the touch-sensing area in the back surface. Note that, in this usage state, the user cannot view the display screen 32 on the back surface. Therefore, it is desirable that power consumption for the display unit that displays the display screen 32 be reduced. For this purpose, in a closed state, the touch-sensing functions of both display screens are enabled (enabled). However, with regard to the display functions, the display function of the display screen 12 is enabled, whereas the display function of the display screen 32 is disabled (disabled). Furthermore, in order to perform this control in association with open/close movements of the case of the portable terminal 100, an open/close detection unit that detects whether the case is open or closed may be provided.

Figure 3:
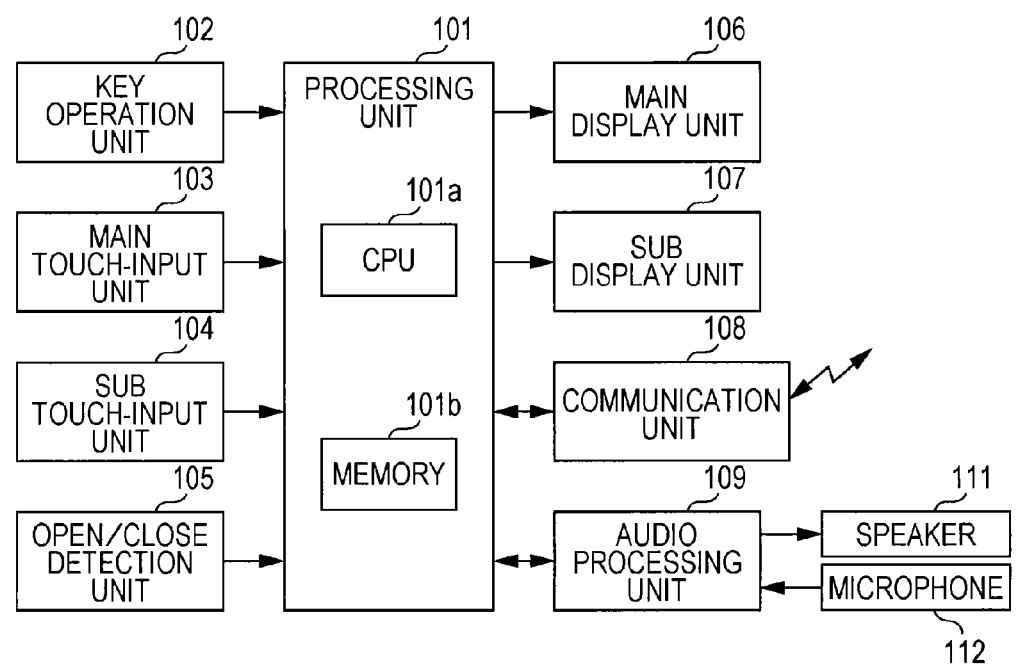
FIG. 3 is a block diagram illustrating a configuration example of control hardware of the portable terminal according to the embodiment of the present disclosure.

FIG. 3 is a block diagram illustrating a configuration example of control hardware of the portable terminal 100.

The portable terminal 100 includes a processing unit 101, a key operation unit 102, a main touch-input unit 103, a sub touch-input unit 104, an open/close detection unit 105, a main display unit 106, a sub display unit 107, a communication unit 108, an audio processing unit 109, a speaker 111, a microphone 112, etc.

The processing unit 101 is a unit that performs various controls and processing of the portable terminal 100 and includes a CPU 101a, a memory 101b, etc. It also functions as a control unit that performs specific control related to the display function and the touch-sensing function according to this embodiment.

The key operation unit 102 is a unit that receives operation input by a user through the operation buttons 21 to 24 illustrated in FIG. 1A.

The main touch-input unit 103 is a unit that provides a touch-input area superposed on the display area of the display screen 12. The sub touch-input unit 104 is a unit that provides a touch-input area superposed on the display area of the display screen 32. In either unit, the touch-sensing method is not limited, and any method may be used.

The open/close detection unit 105 is a unit that detects at least one of the open state and the closed state of the portable terminal 100. Any detection method may be used. A detection unit of any method, such as a magnetic sensor, an optical sensor, a mechanical switch, may be used.

The main display unit 106 is formed of the display device that includes the display screen 12 and is mounted on the main case 10. The sub display unit 107 is formed of the display device that includes the display screen 32 and is mounted on the sub case 30. Although the display devices may be of any type, thin display devices, such as liquid crystal display devices or organic EL devices, may be used.

The communication unit 108 is a unit that performs call for the portable phone terminal and wireless communication for performing data communication. Other than that, a short-distance wireless communication unit, such as wireless LAN or Bluetooth (registered trademark), may be provided.

The audio processing unit 109 includes a device such as an audio codec, which performs coding and decoding of audio signals, and is connected to the speaker 111 for outputting audio, and the microphone 112 for inputting audio.

Figure 4:
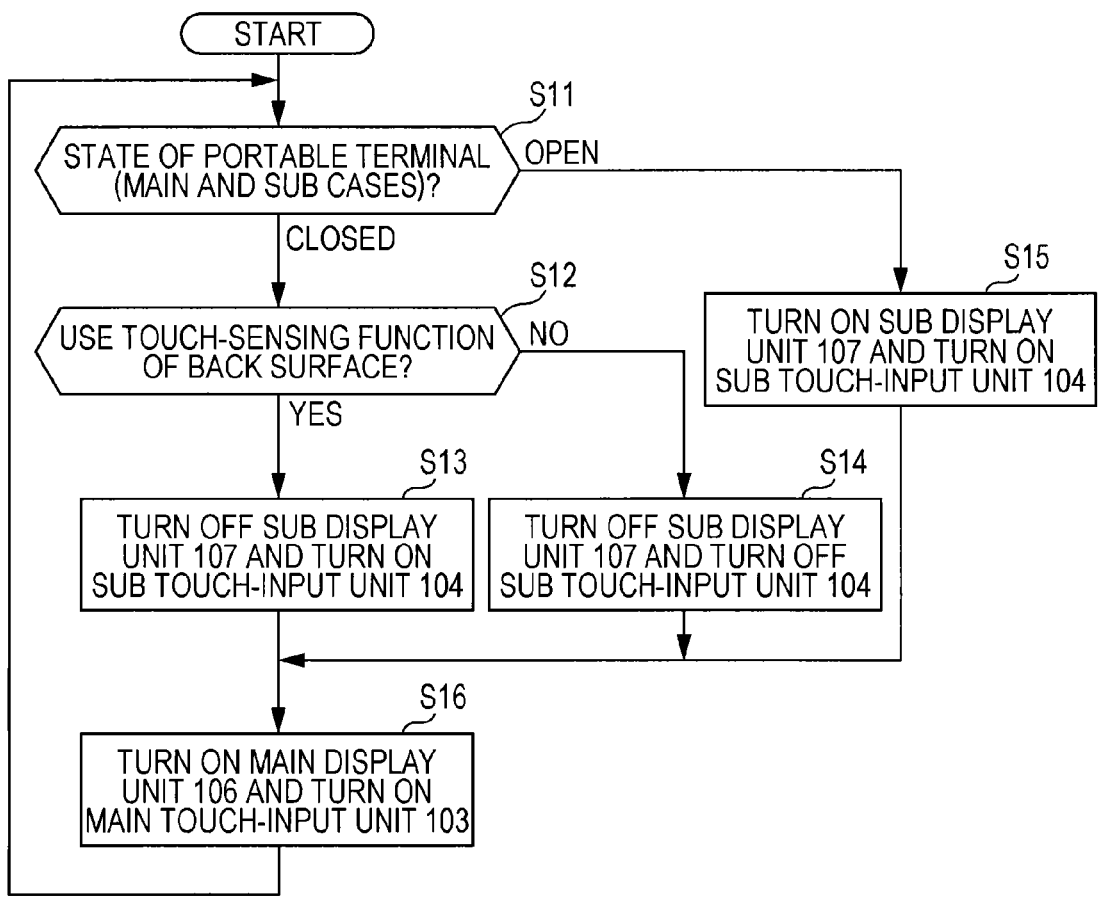
FIG. 4 is a flowchart illustrating a processing example of a processing unit according to the embodiment of the present disclosure.

FIG. 4 illustrates a processing example of the processing unit 101 according to this embodiment. This processing is achieved by the CPU 101a executing a program stored in the memory 101b.

This processing is activated by turning on the portable terminal. First, based on the output of the open/close detection unit 105, the present state of the portable terminal, more specifically, whether it is open or closed, is determined (S11). If it is closed, whether the touch-sensing function of the back surface, i.e., the sub touch-input unit 104, is used or not is determined (S12). This determination can be automatically performed based on, for example, the initial settings, the currently running applications, the current operation mode, etc.

When the touch function of the back surface is used, the sub display unit 107 is disabled (turned off) and the sub touch-input unit 104 is enabled (turned on) (S13). Next, the main display unit 106 is turned on and the main touch-input unit 103 is turned on (S16). Then, the process returns to the first step, S11.

If it is determined that the touch-sensing function of the back surface is not used in the preceding step S12, the sub display unit 107 is turned off and the sub touch-input unit 104 is turned off (S14). Then, the process proceeds to step S16.

If the portable terminal is open in the preceding step S11, the sub display unit 107 is turned on and the sub touch-input unit 104 is turned on (S15). Then, the process proceeds to step S16.

In this manner, by disabling the display unit and the touch-input unit that will not be used, unnecessary processing load and power consumption can be reduced.

Here, referring to FIGS. 5A-5B and 6, an object of the hinge mechanism of the portable terminal 100 according to this embodiment will be described.

Figure 5A:
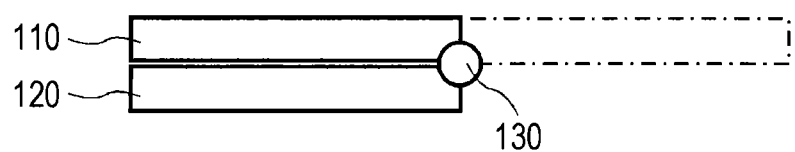
FIGS. 5A and 5B are diagrams for explaining objects to be achieved by the embodiment of the present disclosure.
Figure 5B:
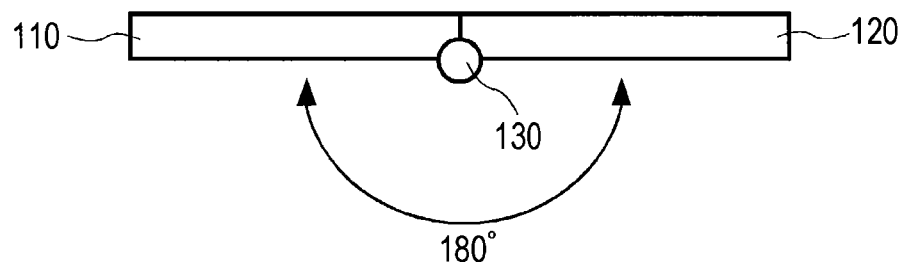

The above-described portable terminal, which involves open/close movements, has a configuration in which a first case 110 and a second case 120 are joined with a hinge portion 130 so as to be rotatable relative to each other, as shown in FIGS. 5A and 5B.

This configuration has the following problems.

(1) Usually, in the closed state shown in FIG. 5A and in the open state shown in FIG. 5B, that is, at a position where the rotation of the hinge portion 130 starts and at a position where the rotation of the hinge portion 130 ends, in order to maintain the orientation stability (prevent rattling) of both cases, a pulling force (rotational pulling force) in the rotation direction is required. A rotational pulling force in a closed state is a force in a direction in which the second case 120 is closed with respect to the first case 110. On the other hand, rotational pulling force in an open state is a force in a direction in which the second case is opened with respect to the first case 110. However, it has been difficult for the conventional hinge portion 130, which has rotational pulling forces in both closed state and open state, to achieve an open angle of 180 degrees.

(2) In order to achieve a two-screen arrangement as shown in FIG. 2A, the hinge portion 130 that has a rotation axis disposed along the long sides of the cases needs to be used. As shown in FIG. 5A, this hinge portion 130 is configured to slightly protrude outward from the outer peripheries (side portions) of the long sides of the closed first case 110 and second case 120. With this configuration, when a closed portable terminal is used in a vertical orientation like a conventional portable phone terminal, the external shape is asymmetrical, which significantly spoils the design.

Referring to FIG. 6, objects related to the external shape of the portable terminal, which are to be achieved by this embodiment, will be described.

A A projection 35, which is produced by the hinge mechanism protruding from side portions of the closed cases, is eliminated.

B In a closed state (open angle of 0 degrees), a rotational pulling force for maintaining that state is generated.

C In an open state, the open angle is 180 degrees, and the surface positions of the display screen 12 of the main case 10 and the display screen 32 of the sub case 30 are on the same plane. Furthermore, the gap between both cases is zero. Furthermore, the ridgelines of the cases at the boundary of both cases are not rounded but flat.

D In an open state, a rotational pulling force for maintaining the open state is generated.

Figure 7A:
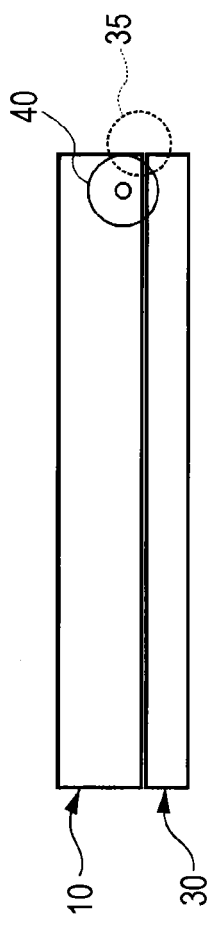
FIGS. 7A, 7B, and 7C are simulated side views of the portable terminal according to this embodiment in a closed state, a transient state, and an open state, respectively.
Figure 7B:
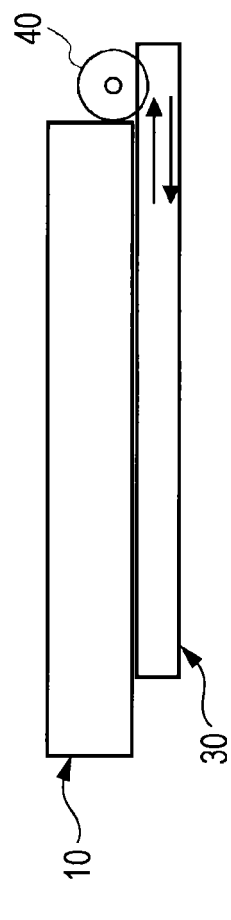
Figure 7C:
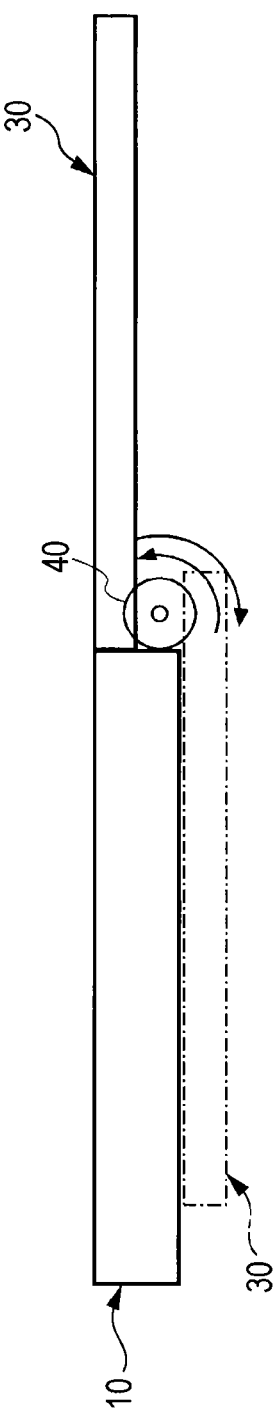

FIGS. 7A, 7B, and 7C are simulated side views of the portable terminal according to this embodiment in a closed state, a transient state, and an open state, respectively.

In the closed state shown in FIG. 7A, the hinge mechanism 40 is stored inside the ends of the cases 10 and 30, and the above-described projection 35 does not exist.

From the closed state shown in FIG. 7A, the sub case 30, together with the hinge mechanism 40, slides relative to the main case 10 by a predetermined amount, parallel to the bottom surface of the main case 10, and becomes the transient state shown in FIG. 7B. As a result, the hinge mechanism 40 protrudes from the end of the main case 10.

FIG. 7C illustrates an open state, in which the sub case 30 in the transient state shown in FIG. 7B has been rotated about the rotation axis of the hinge mechanism 40 by 180 degrees with respect to the main case 10. Adjacent portions on the surfaces of both cases, where the display screens 12 and 32 are exposed, are formed flat. The above-described predetermined amount of sliding is such an amount that the end of the sub case 30 is located next to the end of the main case 10 with no gap therebetween, when the sub case 30 has been rotated with respect to the main case 10 and opened.

Next, referring to FIGS. 8A and 8B, pulling force requirements in a closed state and an open state will be described.

In the closed state shown in FIG. 8A, the sub case 30 can be slid by a predetermined amount relative to the main case 10. It is desirable that a force pulling in a slide-end direction (a direction indicated by arrow A1) (i.e., sliding-pulling force) act at least at a position near the end of a sliding range (a position where both cases are completely closed). Furthermore, although the sub case 30 can be rotated relative to the main case 10, it is desirable that the closed state be stably maintained while an external force due to a user's operation does not act. That is, it is desirable that pulling torque in a rotation direction that maintains the closed state (a direction indicated by arrow A2) act.

In the open state shown in FIG. 8B, it is desirable that the open state be stably maintained. That is, it is desirable that pulling torque in a rotation direction that maintains the open state (a direction indicated by arrow A3) act.

A configuration example of the hinge mechanism 40, which satisfies such plurality of requirements, will be described below.

Figure 9A:
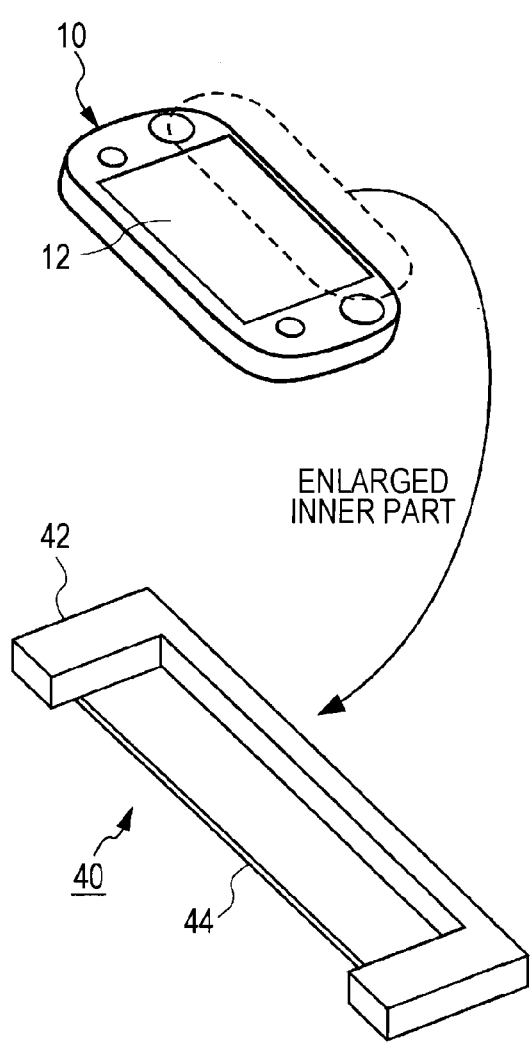
FIGS. 9A and 9B are perspective views of the hinge mechanism in a closed state and an open state.
Figure 9B:
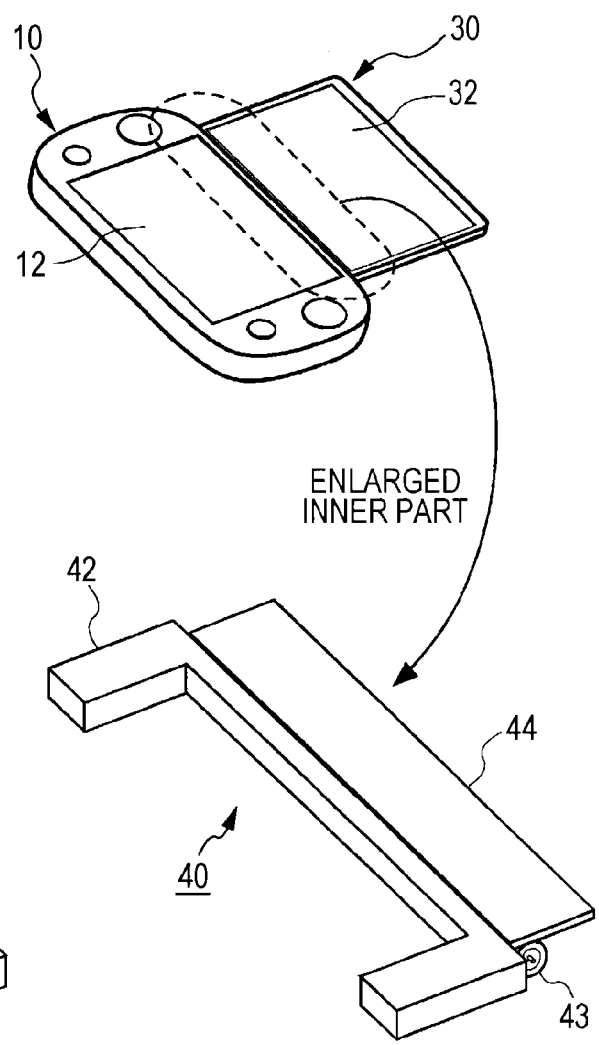

FIGS. 9A and 9B are perspective views of the hinge mechanism 40 in a closed state and an open state.

The hinge mechanism 40 is generally formed of a support frame 42, intermediate portions 43, and a movable member 44.

In this example, the support frame 42 has a substantially angular U-shape (or bracket-shape (])), in which the ends of a square pole having a predetermined length are bent at right angles. The entirety of the support frame 42 is fixed to the main case 10.

In this example, the movable member 44 has a plate-like shape, and the entirety thereof is fixed to the sub case 30.

The intermediate portions 43, which are formed of various components described below, are mechanisms that achieve sliding movement and rotational movement of the movable member 44 relative to the support frame 42. Although the intermediate portions 43 cannot be viewed in FIG. 9A because they are hidden by the support frame 42, a part of the intermediate portions 43 can be viewed in FIG. 9B.

Figure 10:
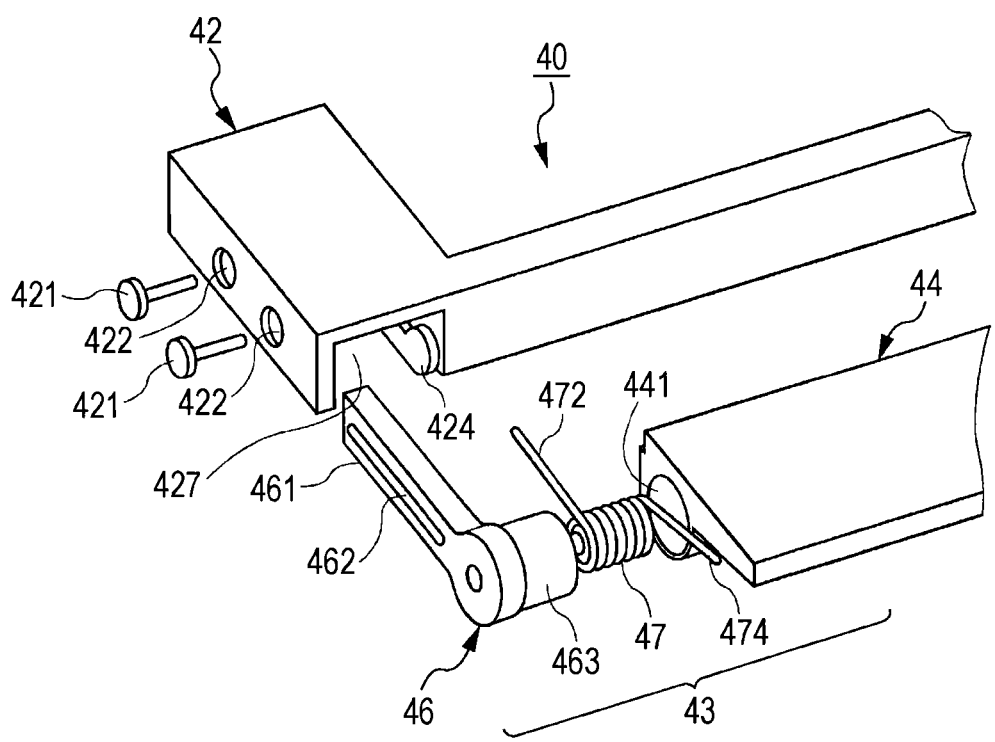
FIG. 10 is an exploded perspective view of the relevant part of the hinge mechanism, viewed from a first angle.
Figure 11:
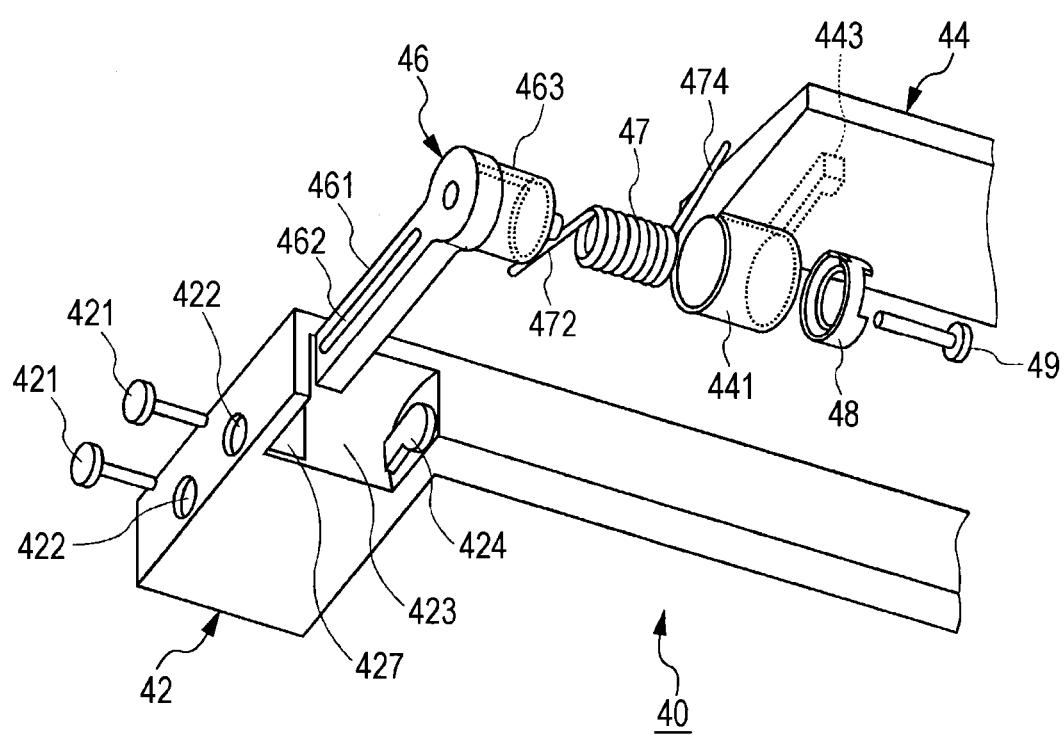
FIG. 11 is an exploded perspective view of the relevant part of the hinge mechanism, viewed in a second angle.

FIGS. 10 and 11 are exploded perspective views of the relevant part of the hinge mechanism 40, viewed from different angles.

The intermediate portions 43 each include a slide arm member 46, a spring (torsion springs) 47, a torque-reversing member 48, and a support shaft 49. In FIG. 10, the torque-reversing member 48 and the support shaft 49 are hidden by the movable member 44. The support shaft 49, which penetrates through other components constituting the intermediate portion 43, is fixed to the outer surface of the slide arm member 46. The method of fixing is not specifically limited. For example, screw fixing or the use of U-ring is possible.

Slide spaces 427, which extend from the bent portions toward free ends (i.e., in a direction perpendicular to the support shaft 49), are formed inside side portions of the support frame 42.

A straight portion 461 of the slide arm member 46 is supported by the support frame 42 so as to be slidable in the slide space 427. Thus, the slide arm member 46 can slide between a protruded position and a stored position in the slide space 427. A sliding groove 462 is formed in the straight portion 461 so as to extend in the longitudinal direction thereof. With the slide arm member 46 accommodated in the slide space 427, two pins 421 are inserted into the sliding groove 462 through openings 422 provided in the side surface of the support frame 42. The pins 421 are inserted into the slide arm member 46 and fixed. This method of fixing is also not specifically limited. The pins 421 prevent the slide arm member 46 from coming off from the slide space 427. Furthermore, the sliding range from the protruded position to the stored position of the slide arm member 46 is determined depending on the distance between the two pins 421 and the length of the sliding groove 462.

The slide arm member 46 includes a cylindrical portion 463 protruding toward a side at the base end of the straight portion 461.

As clearly illustrated in FIG. 11, a hollow portion 423 is formed at the bent portion of the support frame 42. The hollow portion 423 has such a shape and size that it can accommodate a cylindrical portion 463 of the slide arm member 46. A driving portion (or an entrance portion) 424 is formed on the inner side wall of the hollow portion 423. The function of the driving portion 424 will be described below.

The spring 47 functions as an elastic member that urges the movable member 44 toward the slide arm member 46 in a rotation direction, in which the open state of the hinge mechanism 40, and hence, the portable terminal 100, is maintained. A coil portion of the spring 47 is accommodated in the inner space of the cylindrical portion 463. One spring arm 472 protruding from the coil portion extends along the straight portion 461 of the slide arm member 46. The cylindrical portion 463 is accommodated inside a cylindrical space in a cylinder portion 441 formed on a side portion of the movable member 44. As clearly illustrated in FIG. 11, the other spring arm 474 is engaged with a spring-arm accommodating portion 443 formed inside an end of the movable member 44. The configuration for accommodating the spring arm 474 in the spring-arm accommodating portion 443 is not specifically limited. For example, if necessary, a cut portion (not shown) for introducing the spring arm 474 into the spring-arm accommodating portion 443 may be provided in the cylinder portion 441 or the like.

The torque-reversing member 48 is a component that generates a rotational pulling force, which maintains the movable member 44 (sub case 30) in a closed state with respect to the support frame 42 (main case 10), in a closed state. Detailed configuration and movement will be described below.

The support shaft 49 penetrates through the torque-reversing member 48, the cylinder portion 441, the cylindrical portion 463, and the spring 47, and supports these components so as to be rotatable relative to one another.

FIGS. 12A to 12F show a six-side view showing the exteriors of a left side surface, a top surface, a front surface, a bottom surface, a right side surface, and a back surface of the torque-reversing member 48, respectively. The torque-reversing member 48 is a ring-like member having a through-hole 483 substantially at the center thereof. One surface of the ring-like shape is provided with a recess 481 that receives an end of the spring 47, and a cut-away portion 482 from which the spring arm 474 protrudes. The opposite surface is provided with a cut-away portion 484. This cut-away portion 484 has inner walls 484a and 484b, which are bent and face each other with the through-hole 483 therebetween. The movement of the torque-reversing member 48 will be described below.

Using FIGS. 13A to 13C, the schematic movement of the hinge mechanism 40 will be described.

Figure 13A:
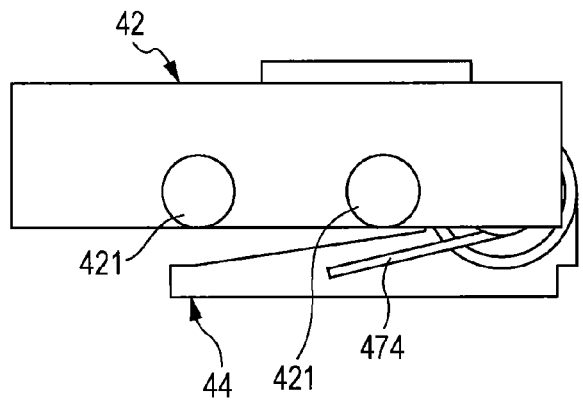
FIGS. 13A to 13C are diagrams for explaining the schematic movement of the hinge mechanism.

In the closed state shown in FIG. 13A, the movable member 44 is folded back onto the support frame 42 while resisting a repulsive force (elastic force) of the spring 47, such that the movable member 44 overlies the support frame 42. A force that maintains this closed state will be described below.

Figure 13B:
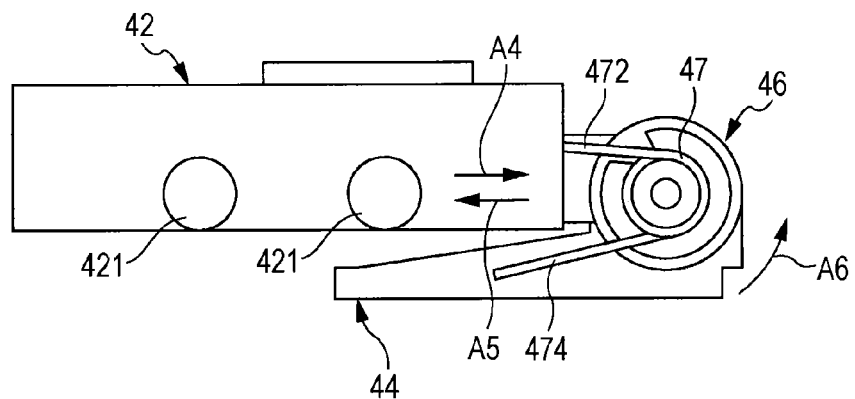

From the closed state shown in FIG. 13A, when a user performs an operation to slide the sub case 30 outwardly (in a direction indicated by arrow A4) relative to the main case 10, the slide arm member 46, together with the movable member 44, is slid in the same direction and reaches the transient state shown in FIG. 13B. Furthermore, when the user performs an operation to return in the opposite direction (a direction indicated by arrow A5), a sliding-pulling force acting in a direction from a certain position in the sliding range toward the terminal end of the sliding range (to the left in the figure) is generated. This will be described in detail below.

Figure 13C:
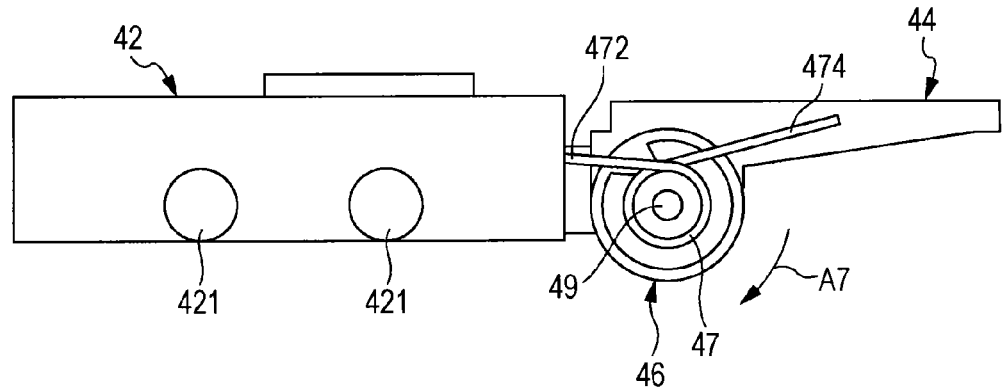

From the transient state shown in FIG. 13B, the movable member 44 is rotated, by a repulsive force of the compressed spring 47, about the support shaft 49 by 180 degrees in the direction indicated by arrow A6 with respect to the support frame 42 and reaches the open state shown in FIG. 13C. The spring 47 is compressed such that a repulsive force is generated in this open state. Therefore, in an open state, a repulsive force of the spring 47 functions as a rotational pulling force that maintains the open state.

It is possible to return from the open state to the closed state in FIG. 13A, via the transient state in FIG. 13B, by a user's operation to return in the direction indicated by arrow A7.

Figure 14A:
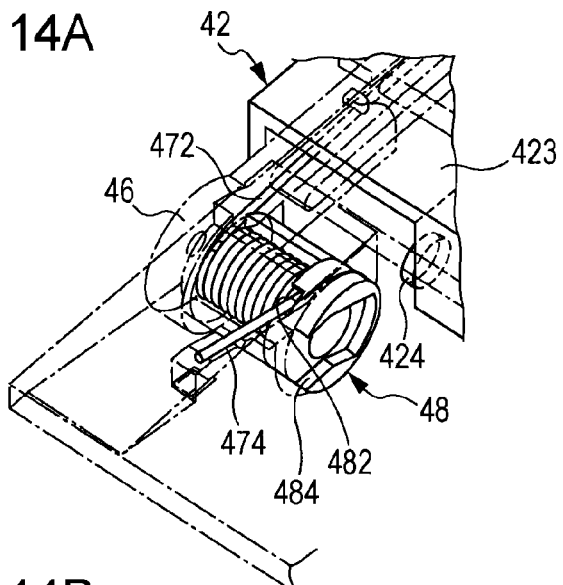
FIGS. 14A to 14C are diagrams for explaining the relationship between a spring and its peripheral components in an open state.
Figure 14B:
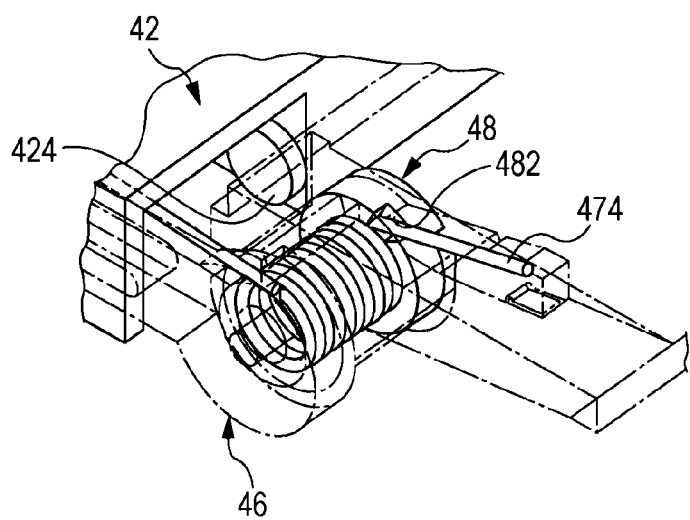
Figure 14C:
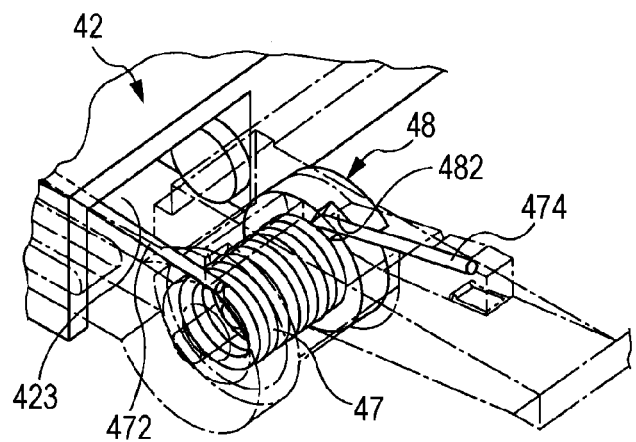

Using FIGS. 14A to 14C, the relationship between the spring 47 and the peripheral components thereof in an open state will be described. FIGS. 14A and 14B are perspective views of the slide arm member 46 protruding from the support frame 42, viewed from different angles. FIG. 14C is a perspective view in which the slide arm member 46 in FIG. 14B is not shown.

The spring 47 is designed to have preload torque that pushes up the movable member 44 from below in an open state, and is incorporated. At this time, one of the spring arms, 474, extends through the cut-away portion 482 in the torque-reversing member 48. It is also possible that a predetermined gap is provided between the spring arm 474 and the cut-away portion 482 in the rotation direction, allowing them to slightly rattle (have an allowance) relative to each other in the rotation direction. When the position (angle) of the spring arm 474 of the spring 47 is changed due to the rotation of the movable member 44, the torque-reversing member 48 is also rotated in accordance therewith. Conversely, when the torque-reversing member 48 rotates, this movement is transmitted to the spring arm 474, and consequently, the movable member 44.

Figure 15A:
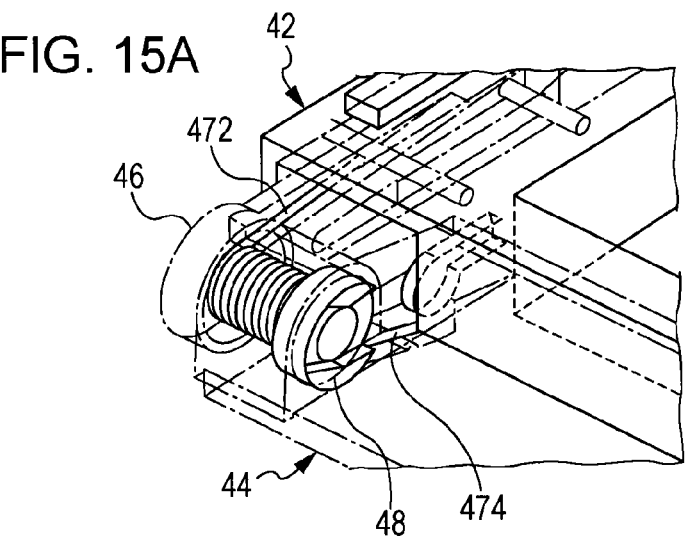
FIGS. 15A to 15C are diagrams for explaining the relationship between the spring and its peripheral components in a transient state.
Figure 15B:
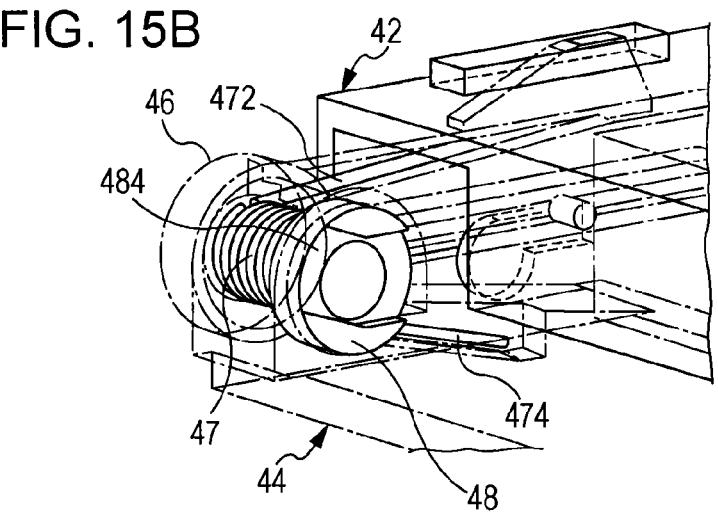
Figure 15C:
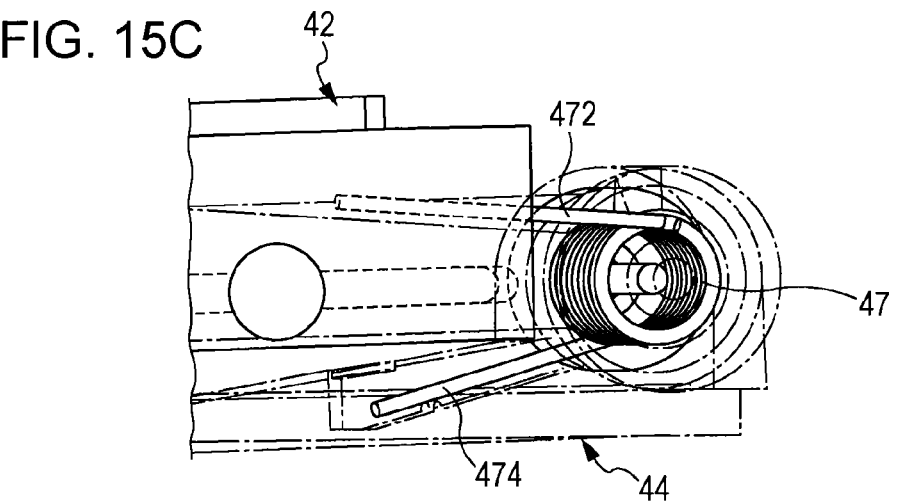

Using FIGS. 15A to 15C, the relationship between the spring 47 and the peripheral components thereof in a transient state will be described. FIG. 15A shows the slide arm member 46 having been slid out of the support frame 42 and protruding therefrom. FIGS. 15B and 15C are partially cut-away perspective views thereof, viewed from different angles.

In this transient state, compared with the open state, the spring arm 474 has been rotated about 180 degrees with respect to the spring arm 472, and the spring 47 is compressed. Therefore, torque that tends to rotate and open the movable member 44 with a greater repulsive force is generated. Furthermore, in this state, as described above, the torque-reversing member 48 is also rotated by a change in position of the spring arm 474.

Figure 16:
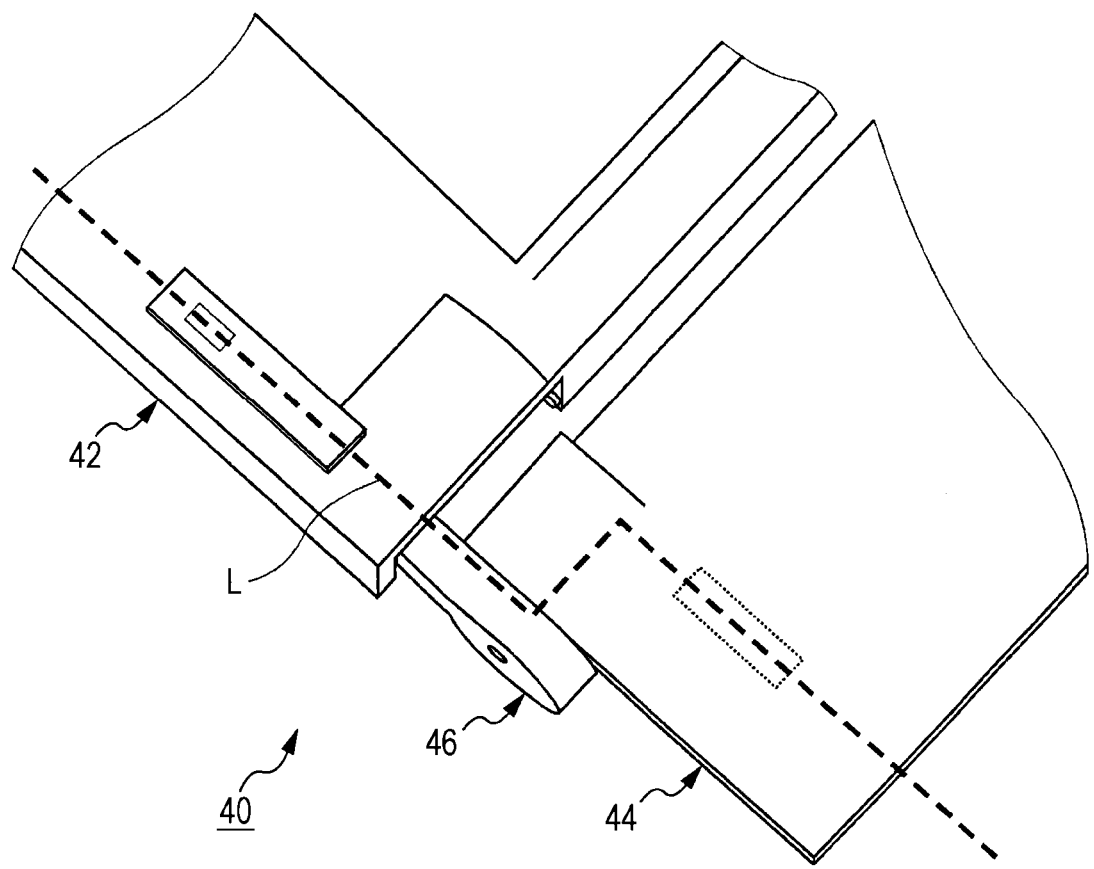
FIG. 16 is a diagram showing a cross-sectional line extending along the spring of the hinge mechanism.

Hereinbelow, the fact that the requirements described with FIGS. 8A and 8B are met will be described, using cross-sectional views mentioned below. These cross-sectional views are cross-sectional views taken along line L, as shown in FIG. 16, which includes the spring arms and the center of the coil of the spring 47 of the hinge mechanism 40. For the support frame 42, a section is taken along a surface perpendicular to the top surface of the support frame 42, along the spring arm 472. For the slide arm member 46 and the movable member 44, a section is taken along a surface perpendicular to the top surface of the movable member 44, along a line extending along the spring arm 472 and a bent line extending via the center of the coil portion of the spring 47 and continuous with the spring arm 474.

Figure 17A:
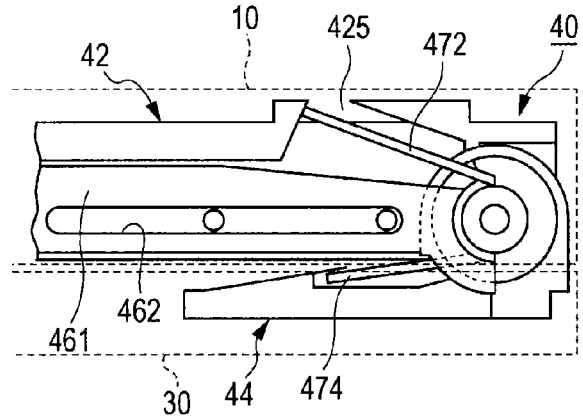
FIGS. 17A, 17B, and 17C are cross-sectional views of the hinge mechanism in a closed state, a transient state, and an open state, respectively.
Figure 17B:
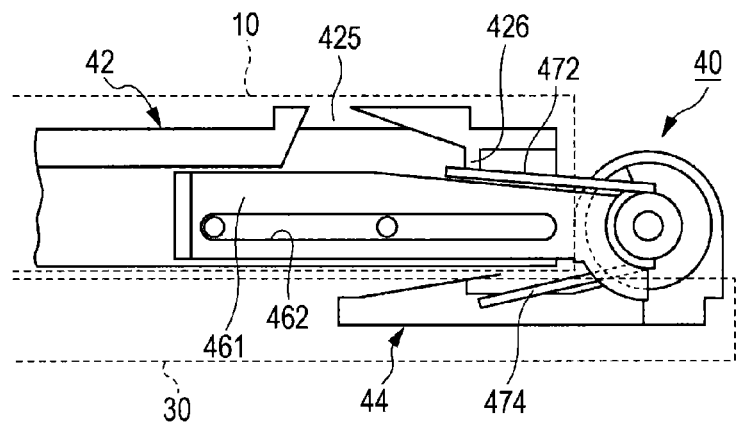
Figure 17C:
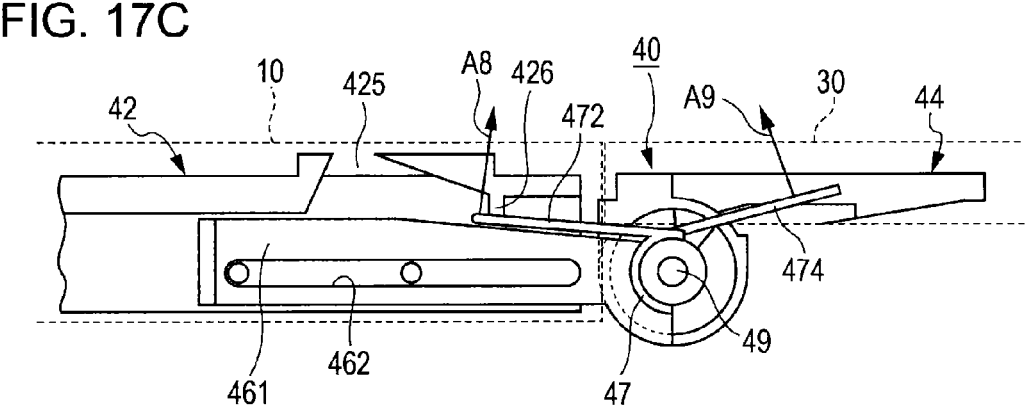

FIGS. 17A, 17B, and 17C are cross-sectional views of the hinge mechanism 40 in a closed state, a transient state, and an open state, respectively.

From FIG. 17A, it can be understood that, in a closed state, the hinge mechanism 40 does not protrude at all from the ends of the main case 10 and the sub case 30, which are arranged on top of each other.

Furthermore, as shown in FIG. 17C, due to the preload torque of the spring 47, torque in the directions indicated by arrows A8 and A9 acts on the support frame 42 and the movable member 44, respectively, about the position of the support shaft 49. This torque serves as a rotational pulling force that maintains the open state. Furthermore, the open angle of this open state is 180 degrees. The ends of the top surfaces of the main case 10 and the sub case 30, facing each other, are arranged flat and side-by-side on the same plane.

Using FIGS. 18A and 18B, a sliding-pulling force generated when the hinge mechanism 40 in the transient state in FIG. 17B approaches the closed state in FIG. 17A by a user's operation will be described.

Figure 18A:
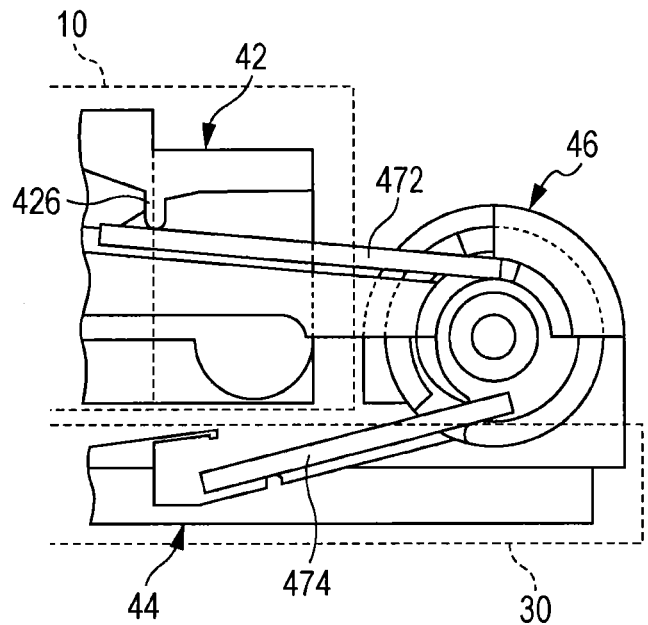
FIGS. 18A and 18B are diagrams for explaining a pulling force in a sliding direction generated when the hinge mechanism approaches a closed state.

FIG. 18A is an enlarged view of the relevant part of the transient state in FIG. 17B. An escape space 425 is provided inside the support frame 42, at a position where the spring arm 472 is accommodated. A projection 426 protruding downward is formed at the entrance of this escape space 425. The spring arm 472 is allowed to move inside the escape space 425. The projection 426 functions as an open-angle limiting portion for the spring arms 472 and 474 during sliding pulling, which will be described below.

As described above, the spring arm 472 is slidable together with the movable member 44 (and the sub case 30) in the horizontal direction (the direction parallel to the back surface of the main case 10), relative to the support frame 42 (and the main case 10). As the slide arm member 46 slides, the position of the spring arm 472 in contact with the projection 426 shifts.

Figure 18B:
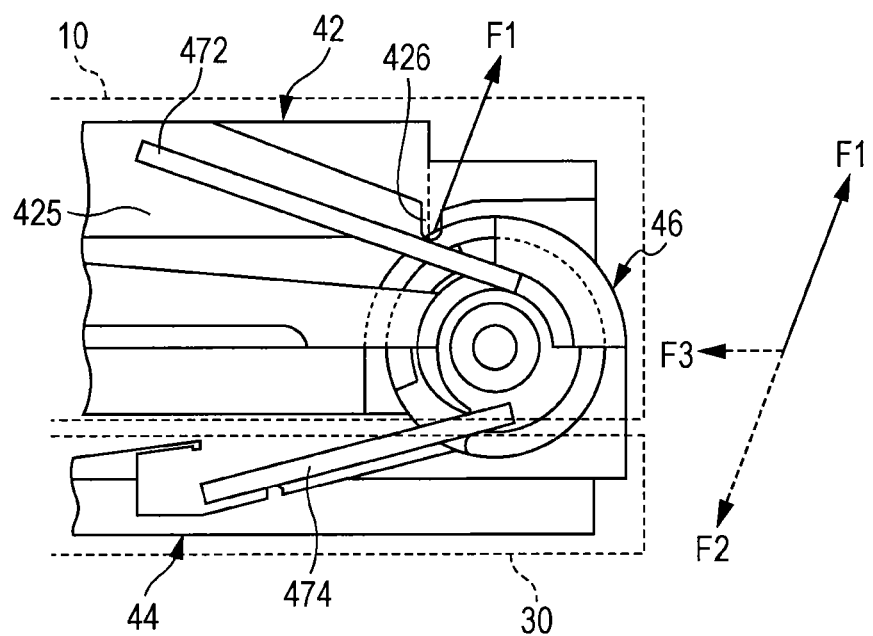

As the spring 47 slides, together with the slide arm member 46, from the state in FIG. 18A to the state in FIG. 18B, the contact position shifts toward the root side of the spring arm 472. As a result, the open angle of the spring arms 472 and 474 increases.

Because of the reaction of a force F1, with which the spring arm 472 pushes the projection 426, a force F2 in the opposite direction acts on the spring arm 472 from the projection 426. Therefore, when a horizontal-direction component F3 of the force F2 exceeds a certain level, the sub case 30 is pulled to a position where it overlies the main case 10 completely (i.e., the terminal end of the sliding range).

As has been described, the slide arm member 46, the spring 47, the slide space 427 in the support frame 42, the projection 426, and the escape space 425 function as a sliding-direction pulling mechanism that pulls the slide arm member 46 into a stored position inside the slide space 427. Therefore, the pulling mechanism uses a torsion spring 47, which has the spring arms 472 and 474, as the spring 47 serving as the elastic member. Sliding pulling is achieved by opening the closed spring arms with a repulsive force thereof in the escape space 425 provided in the support frame 42.

Figure 19A:
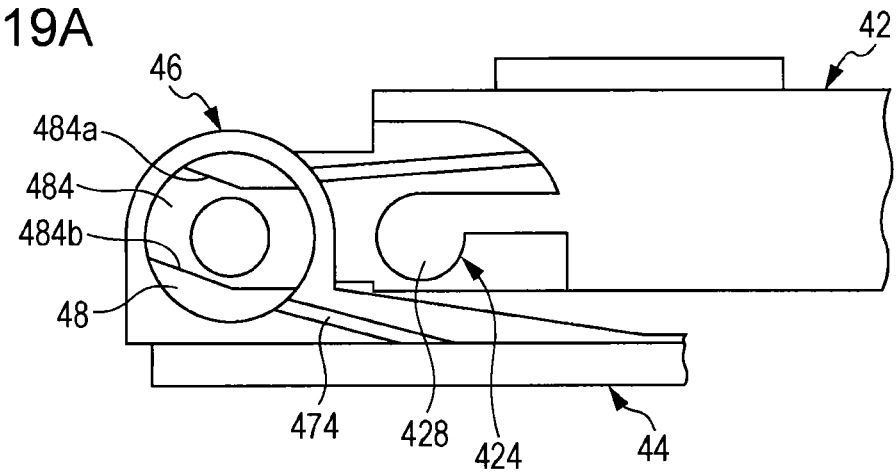
FIGS. 19A to 19C are diagrams for explaining the effect of the hinge mechanism that generates a pulling force in a rotation direction to maintain a closed state.
Figure 19B:
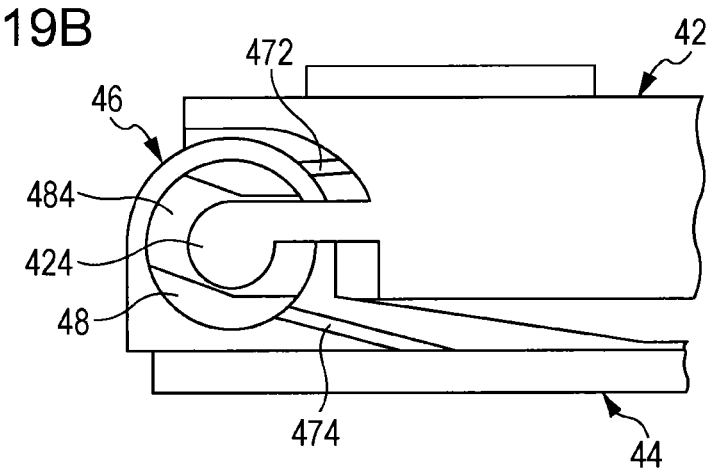
Figure 19C:
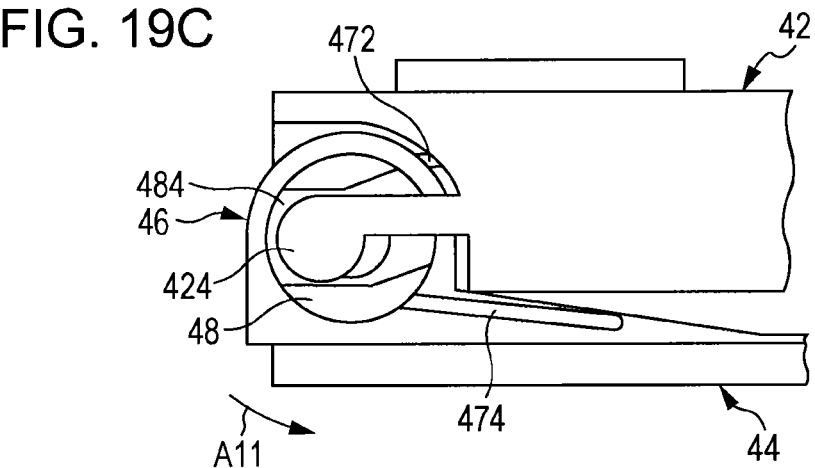

Next, using FIGS. 19A to 19C, the effect of the hinge mechanism 40 that generates a rotational pulling force to maintain the closed state will be described.

These diagrams are cross-sectional views of the torque-reversing member 48 viewed from the cut-away portion 484 (FIG. 12F) side. FIGS. 19A to 19C show a process of change from the transient state in FIG. 17B to the closed state, due to a sliding-pulling force. As described above, the rotation of the torque-reversing member 48 is associated with the rotation of the spring arm 474. When the slide arm member 46 slides, which is shown in FIGS. 19A to 19C, the driving portion 424 formed on the inner wall of the hollow portion 423 of the support frame 42 enters the cut-away portion 484 in the torque-reversing member 48. The driving portion 424 has such a shape that a swelled portion 428 is formed at the tip, which protrudes like a rod. The wall surfaces 484a and 484b of the cut-away portion 484 are bent in the middle thereof. Thus, the torque-reversing member 48 rotates in response to a straight-line movement of the driving portion 424. The spring arm 474 is driven in a direction in which it is forced to close (a direction indicated by arrow A11) by the rotation of the torque-reversing member 48. This mechanism is one type of cam mechanism, in which the driving portion 424 serves as a driver and the torque-reversing member 48 serves as a follower. The wall surfaces 484a and 484b of the cut-away portion 484 function as the cam surfaces. In a closed state, this cam mechanism generates torque in a direction in which the spring 47 is closed, which serves as a rotational pulling force that maintains the movable member 44 (sub case 30) in the closed state with respect to the support frame 42 (main case 10). This torque is referred to as reverse torque in this embodiment. Furthermore, the member for generating this reverse torque is referred to as a torque-reversing member. Note that, in FIG. 19C, the tip of the spring arm 474 is shown such that it moves inside the movable member 44, in order to show how the spring arm 474 is driven toward the support frame 42 by forcible rotation of the torque-reversing member 48 due to the driving portion 424. In actuality, the tip of the spring arm 474 does not have to be movable inside the movable member 44; it may be fixed.

In this manner, by combining the driving portion 424 and the torque-reversing member 48, the movable member 44 is urged in a direction in which it is closed, when the slide arm member 46 is slid and pulled to the stored position. With this configuration, a reverse-torque generating mechanism that generates reverse torque to maintain the closed state is achieved. More specifically, the reverse-torque generating mechanism is formed of the torque-reversing member 48 that is rotated in association with the spring arm 474 on the movable member 44 side and has a predetermined cut-away portion, and the driving portion 424 that is provided on the support frame 42 and is engaged with the cut-away portion 484 during sliding pulling by the pulling mechanism to generate reverse torque.

Figure 20A:
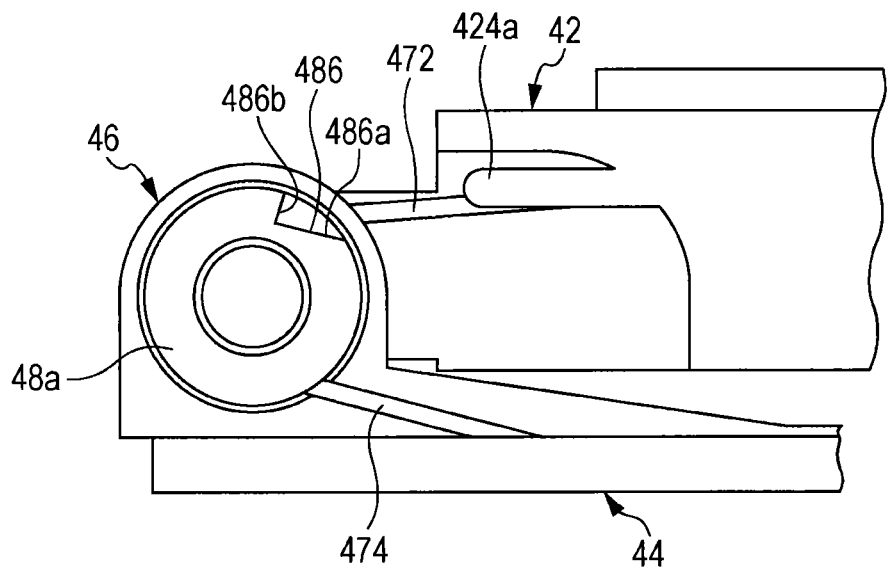
FIGS. 20A and 20B are diagrams illustrating two modifications of a cam mechanism.
Figure 20B:
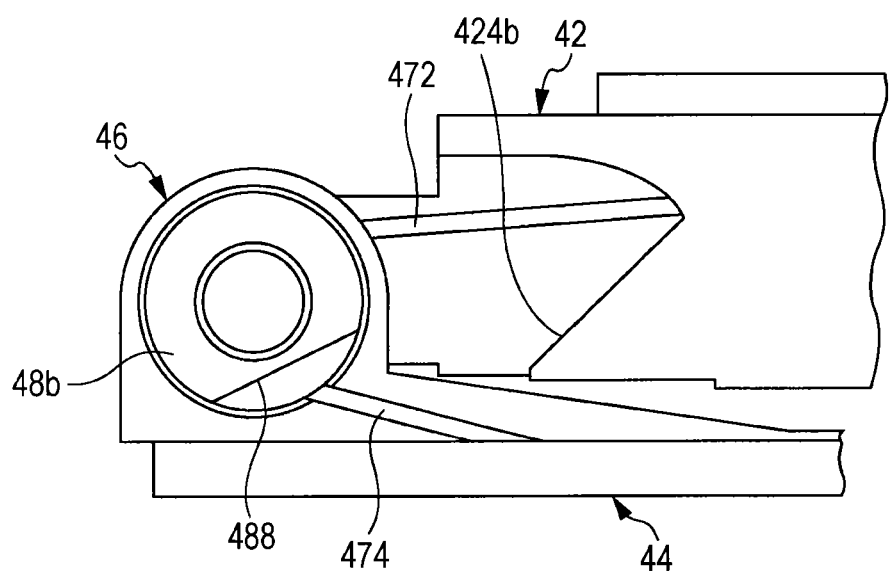

FIGS. 20A and 20B show two modifications of the cam mechanism.

In a first modification shown in FIG. 20A, a torque-reversing member 48a, which has a cut-away portion 486 at a predetermined position of a circular periphery of one surface of the torque-reversing member 48, instead of the cut-away portion 484 in the torque-reversing member 48, is used. The cut-away portion 486 includes a sloped portion 486a and a wall portion 486b standing upright from the deepest portion of this sloped portion 486a. Meanwhile, the support frame 42 is provided with a rod-like driving portion 424a, instead of the driving portion 424. Rotational pulling to a closed state is achieved by the driving portion 424a passing through the sloped portion 486a of the cut-away portion 486 and coming into contact with the wall portion 486b, thereby rotating the torque-reversing member 48a. This mechanism may be regarded as a cam mechanism in which the driving portion 424a serves as a driver and the torque-reversing member 48a serves as a follower. The sloped portion 486a and the wall portion 486b of the cut-away portion 486 function as the cam surfaces.

In a second modification shown in FIG. 20B, a torque-reversing member 48b, which has a cut-away portion 488 at a predetermined position of the circular periphery, instead of the cut-away portion 484 in the torque-reversing member 48, is used. The cut-away portion 488 has such a shape that the corresponding portion of the circle is cut away along a predetermined chord on one surface of the torque-reversing member 48. Meanwhile, the support frame 42 is provided with a triangular driving portion 424b having a predetermined inclined portion, instead of the driving portion 424. Rotational pulling to a closed state is achieved by the torque-reversing member 48b being rotated such that the rotation angle agrees with the angle of the inclined portion of the driving portion 424b, after the driving portion 424b comes into contact with a part of the cut-away portion 488. This mechanism may be regarded as a cam mechanism in which the driving portion 424b serves as a driver and the torque-reversing member 48b serves as a follower. The wall portion of the cut-away portion 488 functions as the cam surface.

According to this embodiment, the above-described objects A to D are achieved. Furthermore, both the sliding movement and the rotational movement can be achieved by a single spring, without providing separate springs. This is beneficial in reducing cost of the device.

In the above-described embodiment, it has been described that (1) an information processing apparatus includes: a first case that includes a first display having a touch-sensing function; a second case that includes a second display having a touch-sensing function; and a hinge mechanism configured to join the first and second cases in a rotatable manner such that both the first and second displays are exposed in a closed state and such that first and second displays are arranged side-by-side on substantially the same plane in an open state.

(2) The information processing apparatus of (1), further comprising: a housing to which the first case, the second case and the hinge mechanism are connected.

(3) The information processing apparatus of (2), wherein the first display and the second display are exposed on opposing surfaces of the housing in the closed state.

(4) The information processing apparatus of any of (2) to (3), wherein a top surface of the housing is parallel to the substantially same plane of the first and second displays in the open state.

(5) The information processing apparatus of any of (1) to (4), further comprising: a detection unit that detects whether the first and second cases are in the open state or the closed state.

(6) The information processing apparatus of (5), further comprising: a processor that controls a status of the second display based on an output of the detection unit.

(7) The information processing apparatus of any of (5) to (6), further comprising: a processor that controls a display function and the touch-sensing function of the second display to be enabled when an output of the detection unit indicates that the first and second cases are in the open state.

(8) The information processing apparatus of claim any of (5) to (7), further comprising: a processor that controls a display function of the second display to be disabled and the touch-sensing function of the second display to be enabled when an output of the detection unit indicates that the first and second cases are in the closed state.

(9) The information processing apparatus of any of (5) to (7), further comprising: a processor that controls a display function and the touch-sensing function of the second display to be disabled when an output of the detection unit indicates that the first and second cases are in the closed state.

(10) The information processing apparatus of any of (5) to (9), further comprising: a processor that acquires information indicating whether the touch-sensing function of the second display should be enabled or disabled in the closed state when an output of the detection unit indicates that the first and second cases are in the closed state, and controls enabling or disabling the touch-sensing function of the second display based on the determination.

(11) The information processing apparatus of (10), wherein the acquired information indicates that the touch-sensing function of the second display is to be enabled in the closed state, and the processor controls the touch-sensing function of the second display to be enabled.

(12) The information processing apparatus of any of (10) to (11), wherein the acquired information indicates that the touch-sensing function of the second display is to be disabled in the closed state, and the processor controls the touch-sensing function of the second display to be disabled.

(13) The information processing apparatus of any of (10) to (12), wherein the acquired information corresponds to one of an initial setting of the information processing apparatus, an application currently running on the information processing apparatus, and a current operational mode of the information processing apparatus.

(14) The information processing apparatus of any of (1) to (13), wherein the hinge mechanism includes: a support frame fixed to the first case and having slide spaces, which extend in a direction perpendicular to a rotation axis, at side portions; slide arm members that slide between a protruded position and a stored position in the slide spaces; a movable member supported by the slide arm members so as to be rotatable; an elastic member that urges the movable member toward the slide arm members in a rotation direction in which the open state is maintained; and a pulling mechanism that pulls the slide arm members to the stored position inside the slide spaces, at an intermediate position between the protruded position and the stored position inside the slide spaces, after the movable member in the open state has been rotated by about 180 degrees while resisting an elastic force of the elastic member.

(15) The information processing apparatus of (14), wherein the pulling mechanism has a torsion spring, which serves as an elastic member and has spring arms at ends, and performs pulling by opening the closed spring arms of the torsion spring with a repulsive force thereof in an escape space provided in the support frame.

(16) The information processing apparatus of any of (14) to (15), wherein the hinge mechanism further includes a reverse-torque generating mechanism that generates reverse torque, which urges the movable member in a direction in which it is closed to maintain the closed state, when the slide arm members are pulled by the pulling mechanism.

(17) The information processing apparatus of (16), wherein the reverse-torque generating mechanism is formed of a torque-reversing member that is rotated in association with the spring arm on the movable member side and has a predetermined cut-away portion, and a driving portion that is provided on the support frame and is engaged with the cut-away portion to generate the reverse torque, when pulled by the pulling mechanism.

(18) The information processing apparatus of any of (1) to (13), wherein the hinge mechanism includes: a support frame fixed to the first case and having slide spaces, which extend in a direction perpendicular to a rotation axis, at side portions; slide arm members that slide between a protruded position and a stored position in the slide spaces; a movable member supported by the slide arm members so as to be rotatable; an elastic member that urges the movable member toward the slide arm members in a rotation direction in which the open state is maintained; and a pulling mechanism that pulls the slide arm members to the stored position inside the slide spaces, at an intermediate position between the protruded position and the stored position inside the slide spaces, after the movable member in the open state has been rotated by about 180 degrees while resisting an elastic force of the elastic member.

(19) The information processing apparatus of (18), wherein the pulling mechanism has a torsion spring, which serves as an elastic member and has spring arms at ends, and can perform pulling by opening the closed spring arms of the torsion spring with a repulsive force thereof in an escape space provided in the support frame.

(20) The information processing apparatus of (18) or (19), wherein the hinge mechanism further includes a reverse-torque generating mechanism that generates reverse torque, which urges the movable member in a direction in which it is closed to maintain the closed state, when the slide arm members are pulled by the pulling mechanism.

The invention claimed is:

1. An information processing apparatus comprising:
   a first case that includes a first display having a touch-sensing function;
   a second case that includes a second display having a touch-sensing function;
   a hinge mechanism configured to join the first and second cases in a rotatable manner such that both the first and second displays are exposed in a closed state and such that first and second displays are arranged side-by-side on substantially the same plane in an open state, wherein the hinge mechanism includes
      a reverse-torque generating mechanism that generates reverse torque, which urges a movable member in a direction in which it is closed to maintain the closed state, and
      the reverse-torque generating mechanism is formed of a torque-reversing member that is rotated in association with a spring arm on the movable member side and has a predetermined cut-away portion, and a driving portion that is provided on a support frame and is engaged with the cut-away portion to generate the reverse torque, when pulled by a pulling mechanism; and
   circuitry configured to
      determine whether the first and second cases are in the open state or the closed state;
      acquire information indicating whether the touch-sensing function of the second display should be enabled or disabled in the closed state when a result of the determining indicates that the first and second cases are in the closed state; and
      control enabling or disabling the touch-sensing function of the second display based on the determining, wherein
      the acquired information corresponds to an application currently running on the information processing apparatus.

2. The information processing apparatus of claim 1, further comprising:
   a housing to which the first case, the second case and the hinge mechanism are connected.

3. The information processing apparatus of claim 2, wherein
   the first display and the second display are exposed on opposing surfaces of the housing in the closed state.

4. The information processing apparatus of claim 2, wherein
   a top surface of the housing is parallel to the substantially same plane of the first and second displays in the open state.

5. The information processing apparatus of claim 1, wherein the circuitry is configured to control a display function and the touch-sensing function of the second display to be enabled when a result of the determining indicates that the first and second cases are in the open state.

6. The information processing apparatus of claim 1, wherein the acquired information indicates that a display function of the second display is to be disabled and the touch-sensing function of the second display is to be enabled in the closed state, and
   the circuitry is configured to control the display function of the second display to be disabled and the touch-sensing function of the second display to be enabled when a result of the determining indicates that the first and second cases are in the closed state.

7. The information processing apparatus of claim 1, wherein the acquired information indicates that a display function and the touch-sensing function of the second display is to be disabled in the closed state, and
   the circuitry is configured to control the display function and the touch-sensing function of the second display to be disabled when a result of the determining indicates that the first and second cases are in the closed state.

8. The information processing apparatus of claim 1, wherein
   the acquired information indicates that the touch-sensing function of the second display is to be enabled in the closed state, and
   the circuitry is configured to control the touch-sensing function of the second display to be enabled when a result of the determining indicates that the first and second cases are in the closed state.

9. The information processing apparatus of claim 1, wherein
   the acquired information indicates that the touch-sensing function of the second display is to be disabled in the closed state, and
   the circuitry is configured to control the touch-sensing function of the second display to be disabled when a result of the determining indicates that the first and second cases are in the closed state.

10. The information processing apparatus of claim 1, wherein
    the hinge mechanism includes:
       the support frame fixed to the first case and having slide spaces, which extend in a direction perpendicular to a rotation axis, at side portions;
       slide arm members that slide between a protruded position and a stored position in the slide spaces;
       the movable member supported by the slide arm members so as to be rotatable;
       an elastic member that urges the movable member toward the slide arm members in a rotation direction in which the open state is maintained; and the pulling mechanism that pulls the slide arm members to the stored position inside the slide spaces, at an intermediate position between the protruded position and the stored position inside the slide spaces, after the movable member in the open state has been rotated by about 180 degrees while resisting an elastic force of the elastic member.

11. The information processing apparatus of claim 10, wherein the pulling mechanism has a torsion spring, which serves as an elastic member and has spring arms at ends, and performs pulling by opening the closed spring arms of the torsion spring with a repulsive force thereof in an escape space provided in the support frame.

12. The information processing apparatus of claim 10, wherein the reverse-torque generating mechanism that generates the reverse torque, which urges the movable member in the direction in which it is closed to maintain the closed state, when the slide arm members are pulled by the pulling mechanism.

13. An information processing apparatus comprising:

a first case that includes a first display having a touch-sensing function;

a second case that includes a second display having a touch-sensing function;

a hinge mechanism configured to join the first and second cases in a rotatable manner such that both the first and second displays are exposed in a closed state and such that first and second displays are arranged side-by-side on substantially the same plane in an open state, wherein the hinge mechanism includes:

a support frame fixed to the first case and having slide spaces, which extend in a direction perpendicular to a rotation axis, at side portions;

slide arm members that slide between a protruded position and a stored position in the slide spaces;

a movable member supported by the slide arm members so as to be rotatable;

an elastic member that urges the movable member toward the slide arm members in a rotation direction in which the open state is maintained; and a pulling mechanism that pulls the slide arm members to the stored position inside the slide spaces, at an intermediate position between the protruded position and the stored position inside the slide spaces, after the movable member in the open state has been rotated by about 180 degrees while resisting an elastic force of the elastic member, the hinge mechanism further includes a reverse-torque generating mechanism that generates reverse torque, which urges the movable member in a direction in which it is closed to maintain the closed state, when the slide arm members are pulled by the pulling mechanism, and the reverse-torque generating mechanism is formed of a torque-reversing member that is rotated in association with the spring arm on the movable member side and has a predetermined cut-away portion, and a driving portion that is provided on the support frame and is engaged with the cut-away portion to generate the reverse torque, when pulled by the pulling mechanism.

14. An information processing apparatus comprising:

a first case that includes a first display having a touch-sensing function;

a second case that includes a second display having a touch-sensing function;

a hinge mechanism configured to join the first and second cases in an open state and a closed state, wherein the hinge mechanism includes a reverse-torque generating mechanism that generates reverse torque, which urges a movable member in a direction in which it is closed to maintain the closed state, and the reverse-torque generating mechanism is formed of a torque-reversing member that is rotated in association with a spring arm on the movable member side and has a predetermined cut-away portion, and a driving portion that is provided on a support frame and is engaged with the cut-away portion to generate the reverse torque, when pulled by a pulling mechanism; and circuitry configured to determine whether the first and second cases are in the open state or the closed state;

acquire information indicating whether the touch-sensing function of the second display should be enabled or disabled in the closed state when a result of the determining indicates that the first and second cases are in the closed state; and control enabling or disabling the touch-sensing function of the second display based on the determining and the acquired information, wherein the acquired information corresponds to an application currently running on the information processing apparatus.

* * * * *